US010697780B2

(12) United States Patent
Tsurumi et al.

(10) Patent No.: US 10,697,780 B2
(45) Date of Patent: Jun. 30, 2020

(54) POSITION CORRECTION APPARATUS, NAVIGATION SYSTEM AND AUTOMATIC DRIVING SYSTEM

(71) Applicant: DENSO CORPORATION, Kariya, Aichi-pref. (JP)

(72) Inventors: Kiyoshi Tsurumi, Kariya (JP); Takeshi Shikimachi, Kariya (JP); Tadashi Fujimura, Kariya (JP); Tomokazu Kobayashi, Kariya (JP); Yuya Hara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 11 days.

(21) Appl. No.: 16/074,091

(22) PCT Filed: Feb. 3, 2017

(86) PCT No.: PCT/JP2017/004042
§ 371 (c)(1),
(2) Date: Jul. 31, 2018

(87) PCT Pub. No.: WO2017/135431
PCT Pub. Date: Aug. 10, 2017

(65) Prior Publication Data
US 2019/0120630 A1    Apr. 25, 2019

(30) Foreign Application Priority Data
Feb. 3, 2016 (JP) ................... 2016-019190

(51) Int. Cl.
*G01C 21/28* (2006.01)
*G01S 19/40* (2010.01)
(Continued)

(52) U.S. Cl.
CPC ............. *G01C 21/28* (2013.01); *B60W 30/10* (2013.01); *G01C 21/165* (2013.01); *G01C 21/34* (2013.01);
(Continued)

(58) Field of Classification Search
CPC ...... G01C 21/28; G01C 21/165; G01C 21/34; G01S 19/49; G05D 1/0257; G05D 1/0278; G05D 2201/0213
(Continued)

(56) References Cited

U.S. PATENT DOCUMENTS 5,922,036 A * 7/1999 Yasui ................. G01C 21/26
701/28
5,949,375 A * 9/1999 Ishiguro ............... G01S 19/49
342/457
(Continued)

FOREIGN PATENT DOCUMENTS

JP         2015511281 A      4/2015

*Primary Examiner* — Marthe Y Marc-Coleman
(74) *Attorney, Agent, or Firm* — Harness, Dickey & Pierce, P.L.C.

(57) ABSTRACT

A position correction device includes: a reception unit, a position acquisition unit, a determination unit and a position information transmission unit. The reception unit receives a position information S1 of a vehicle from a navigation apparatus. The position acquisition unit acquires a position information S2 of the vehicle with a higher accuracy than the navigation apparatus. The determination unit determines whether a difference between the position information S1 and the position information S2 exceeds a predetermined threshold, or determines whether a traveling road identified by the position information S1 matches a traveling road identified by the position information S2. At least when it is determined that the difference exceeds the threshold, or when it is determined that the identified traveling roads do not match, the position information transmission unit transmits the position information S2 to the navigation apparatus.

7 Claims, 7 Drawing Sheets

(51) Int. Cl.
*G01S 19/42* (2010.01)
*B60W 30/10* (2006.01)
*G01C 21/16* (2006.01)
*G01C 21/34* (2006.01)
*G01S 19/49* (2010.01)
*G05D 1/02* (2020.01)
*G01S 19/14* (2010.01)
*G01S 19/47* (2010.01)

(52) U.S. Cl.
CPC ............ *G01S 19/40* (2013.01); *G01S 19/426* (2013.01); *G01S 19/49* (2013.01); *G05D 1/0257* (2013.01); *G05D 1/0278* (2013.01); *G01S 19/14* (2013.01); *G01S 19/47* (2013.01); *G05D 2201/0213* (2013.01)

(58) Field of Classification Search
USPC ......................................................... 701/445
See application file for complete search history.

(56) References Cited

U.S. PATENT DOCUMENTS

| | | | |
|---|---|---|---|
| 6,032,098 A * | 2/2000 | Takahashi | ............... G01C 21/28 701/23 |
| 6,792,352 B1 | 9/2004 | Hoffmann et al. | |
| 2009/0228204 A1 | 9/2009 | Zavoli et al. | |

\* cited by examiner

US 10,697,780 B2

POSITION CORRECTION APPARATUS, NAVIGATION SYSTEM AND AUTOMATIC DRIVING SYSTEM

CROSS REFERENCE TO RELATED APPLICATIONS

This application is a U.S. National Phase Application under 35 U.S.C. 371 of International Application No. PCT/JP2017/004042 filed on Feb. 3, 2017 and published in Japanese as WO 2017/135431 A1 on Aug. 10, 2017. This application is based on and claims the benefit of priority from Japanese Patent Application No. 2016-019190 filed on Feb. 3, 2016. The entire disclosures of all of the above applications are incorporated herein by reference.

TECHNICAL FIELD

The present disclosure relates to a position correction apparatus, a navigation system and an automatic driving system.

BACKGROUND ART

Conventionally, a navigation apparatus that acquires a position of a subject vehicle and sets a route from the position to a destination is known. Patent Literature 1 discloses such navigation apparatus.

PRIOR ART LITERATURE

Patent Literature

Patent Literature 1: JP 2011-511281 A

SUMMARY OF INVENTION

A difficulty as bellow has been found through a detailed examination by inventors. Accuracy at when the navigation apparatus acquires a position information of a subject vehicle may not be necessarily high. When the position information of the subject vehicle is inaccurate, the navigation apparatus may set an inappropriate route. For example, in a road including a side road branching from a main load, the navigation apparatus sometimes determines that the position of the subject vehicle is on the side road though the position of the subject vehicle is actually on the main road. In this case, the navigation apparatus may set an inappropriate route from the side load to the destination.

It is an object of the present disclosure to provide a position correction apparatus, a navigation system and an automatic driving system enabling a navigation apparatus to acquire an accurate position information of the subject vehicle.

According to one aspect of the present disclosure, a position correction apparatus mounted on a vehicle includes: a reception unit that receives a position information defined as S1 from a navigation apparatus being mounted on the vehicle and having a function acquiring the position information defined as S1 of the vehicle; a position acquisition unit that acquires a position information defined as S2 of the vehicle with higher accuracy than the navigation apparatus; a determination unit that determines whether a difference between the position information defined as S1 received by the reception unit and the position information defined as S2 acquired by the position acquisition unit exceeds a predetermined threshold or whether a traveling route identified by the position information defined as S1 matches a traveling route identified by the position information defined as S2; and a position information transmission unit that transmits the position information defined as S2 acquired by the position acquisition unit to the navigation apparatus when the determination unit determines that the difference exceeds the predetermined threshold or when the determination unit determines that the traveling route identified by the position information defined as S1 mismatches the traveling route identified by the position information defined as S2.

The position correction apparatus according to one aspect of the present disclosure may be possible to acquire the position information S2 that is more accurate than the position information S1 acquired by the navigation apparatus. The position correction apparatus according to one aspect of the present disclosure transmits the position information S2 to the navigation apparatus when the difference between the position information S1 and the position information S2 exceeds the predetermined threshold or when the traveling route identified by the position information S1 mismatches the traveling route identified by the position information S2. Thereby, the navigation apparatus may be possible to acquire the accurate position information of the vehicle even when the position information S1 has a large error. Consequently, the navigation apparatus may be possible to generate the route starting from the accurate position of the vehicle.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Embodiments of the present disclosure will be explained with reference to the drawings.

First Embodiment

1. Configuration of Automatic Driving System 1

Figure 1:
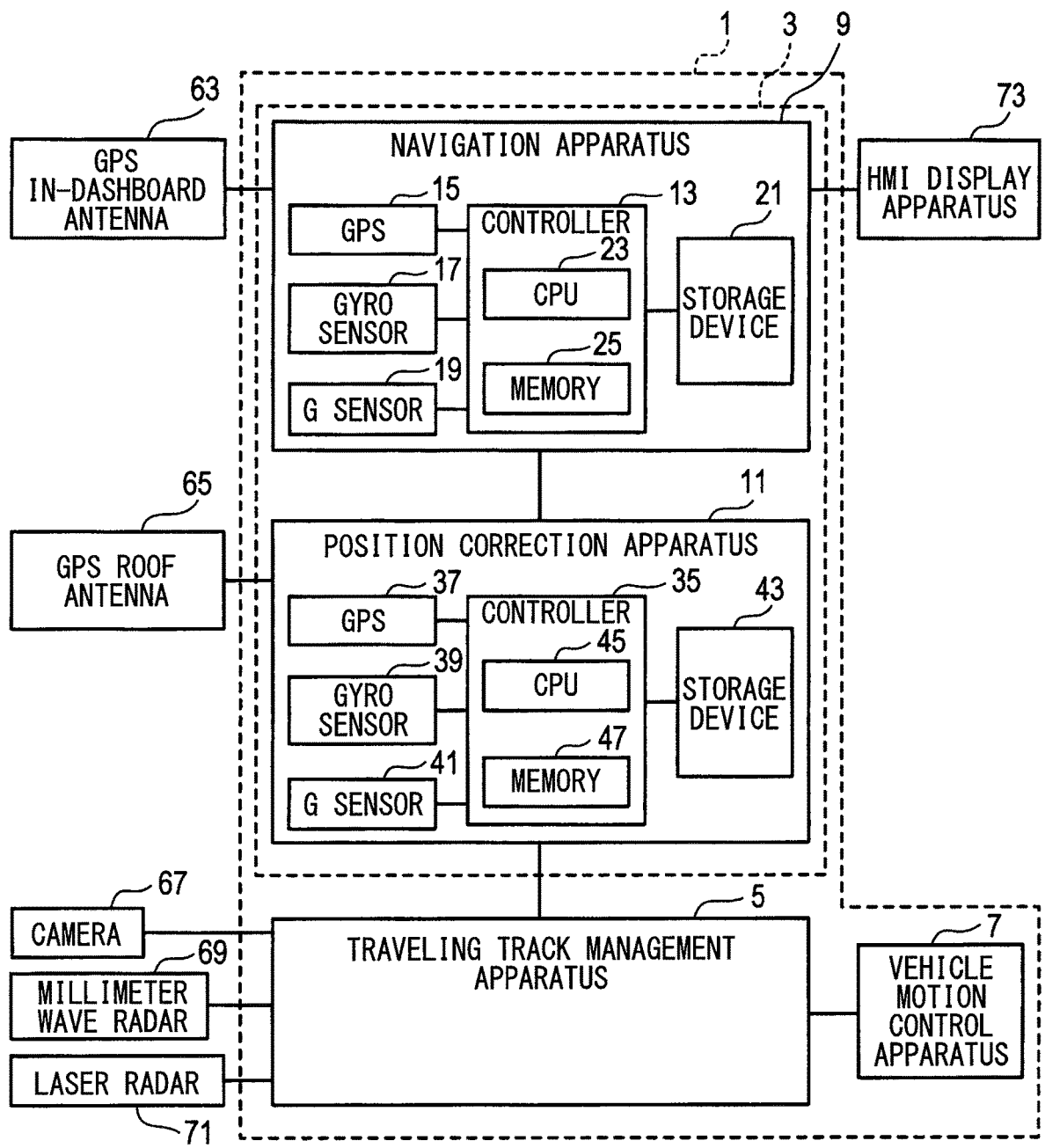
FIG. 1 is a block diagram showing configurations of a position correction apparatus, a navigation system, and an automatic driving system.

A configuration of an automatic driving system 1 will be explained with reference to FIGS. 1 to 3. The automatic driving system 1 is an onboard system mounted on a vehicle. Hereinafter, the vehicle mounted with the automatic driving system 1 may be referred to as a subject vehicle. The automatic driving system 1 includes a navigation system 3, a traveling track management apparatus 5 and a vehicle motion control apparatus 7. The navigation system 3 includes a navigation apparatus 9 and a position correction apparatus 11.

The navigation apparatus 9 includes a controller 13, a GPS 15, a gyro sensor 17, a G sensor 19 and a storage device 21. The controller 13 is mainly configured by a known microcomputer including a CPU 23 and a semiconductor memory (hereinafter, may be referred to as a memory 25) such as a RAM, a ROM and a flash memory. The CPU 23 executes a program stored in a non-transitory tangible storage medium, and thereby each kind of functions of the controller 13 is provided. In the example, the memory 25 corresponds to the non-transitory tangible storage medium storing the program. A method corresponding to the program is executed by the execution of the program. The number of a microcomputer configuring the controller 13 may be one or more.

Figure 2:
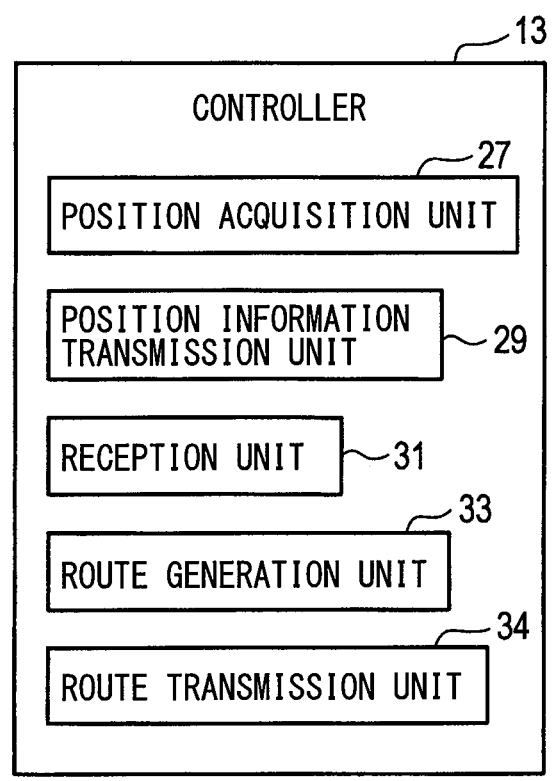
FIG. 2 is a block diagram showing a functional configuration of a controller.

As shown in FIG. 2, the controller 13 includes a position acquisition unit 27, a position information transmission unit 29, a reception unit 31, a route generation unit 33 and a route transmission unit 34 as configurations of functions provided by the execution of the program by the CPU 23. The method that implements these elements configuring the controller 13 is not limited to software. All or a part of these elements may be implemented by using hardware provided by combining a logic circuit or an analog circuit or the like.

The GPS 15 is a positioning system with use of an artificial satellite. The gyro sensor 17 detects angular velocity of the subject vehicle. The G sensor 19 detects acceleration of the subject vehicle. The storage device 21 stores an information required for a process executed by the navigation apparatus 9. The information includes a road network information. The road network information includes a map information showing a road shape, a road position, a connection between multiple roads, or the like. The road network information does not include information related to a traffic lane configuring the road.

The position correction apparatus 11 includes a controller 35, a GPS 37, a gyro sensor 39, a G sensor 41 and a storage device 43. The controller 35 is mainly configured by a known microcomputer including a CPU 45 and the semiconductor memory (hereinafter, may be referred to as a memory 47) such as RAM, ROM and a flash memory. The CPU 45 executes a program stored in the non-transitory tangible storage medium, and thereby each kind of functions of the controller 35 is provided. In the example, the memory 47 corresponds to the non-transitory tangible storage medium storing the program. A method corresponding to the program is operated by the execution of the program. The number of a microcomputer configuring the controller 35 may be one or more.

Figure 3:
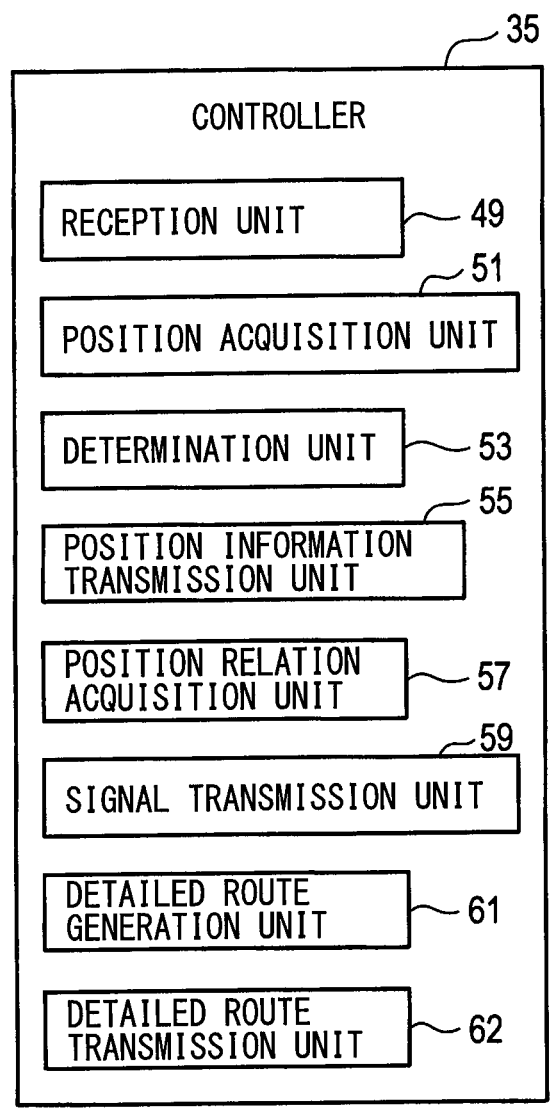
FIG. 3 is a block diagram showing a functional configuration of a controller.

As shown in FIG. 3, the controller 35 includes a reception unit 49, a position acquisition unit 51, a determination unit 53, a position information transmission unit 55, a position relation acquisition unit 57, a signal transmission unit 59, a detailed route generation unit 61, and a detailed route transmission unit 62 as configurations of functions provided by the execution of the program by the CPU 45. The method that implements these elements configuring the controller 35 is not limited to software. All or a part of these elements may be implemented by using hardware provided by combining a logic circuit or an analog circuit or the like.

The GPS 37 is a positioning system with use of the artificial satellite. The gyro sensor 39 detects angular velocity of the subject vehicle. The G sensor 41 detects acceleration of the subject vehicle. In regard to an installation angle to a vehicle body of the subject vehicle, the gyro sensor 39 and the G sensor 41 are optimized in comparison to the gyro sensor 17 and the G sensor 19.

The storage device 43 stores a necessary information for a process executed by the position correction apparatus 11. The information includes a road network information and a detailed map information. The road network information may be similar to the route network information included by the navigation apparatus 9, or may be generated with reference to a maintenance standard different from the road network included by the navigation apparatus 9 for the automatic operation.

The detailed map information includes the number of the traffic lanes configuring the road, a width of the traffic lane, the position and a kind of a white lane and a botts dot dividing the traffic lane, increase or decrease of the traffic lane, a connection relation between traffic lanes, a propriety of the vehicle motion between the traffic lanes or the like. The detailed map information includes a position information T of a feature, a size of the feature, a shape of the feature, a kind of the feature, or the like. The feature shows the something on the road. The feature includes, for example, a building, a fence, a telegraph pole, a traffic island, a median strip, a zebra zone, a traffic sign, a kilometer post, a stop line, an ETC gate, the white lane, a road paint such as a speed regulation, the botts dot, a street tree, an underground ventilator, a signboard, a curbstone, a rail road crossing, a traffic signal, a bridge, a tunnel, a shelter, a mountain, a rive, or the like. The position information T identifies the position of the feature. The storage device 43 corresponds to the feature information storage device. The position information T may be referred to as a position information defined as T.

As described later, the traveling track management apparatus 5 generates a traveling track information identifying the traveling track by using the detailed route generated by the position correction apparatus 11 and transmits the traveling track to the vehicle motion control apparatus 7. The vehicle motion control apparatus 7 controls the subject vehicle so that the vehicle automatically travels along the traveling track.

In addition to the automatic driving system 1, the subject vehicle includes a GPS in-dashboard antenna 63, a GPS roof antenna 65, a camera 67, a millimeter wave radar 69 and a laser radar 71 and a HMI display apparatus 73.

The GPS in-dashboard antenna 63 receives a satellite information and transmits the satellite information to the GPS 15. The GPS roof antenna 65 receives the satellite information and transmits the satellite information to the GPS 37. The camera 67 photographs the peripheral of the subject vehicle. The image generated by the camera 67 is transmitted to the traveling track management apparatus 5 and the position correction apparatus 11. The millimeter wave radar 69 and the laser radar 71 detect the position of the feature. The detection results of the millimeter wave radar 69 and the laser radar 71 are transmitted to the traveling track management apparatus 5 and the position correction apparatus 11.

The HMI display apparatus 73 receives an operation by an occupant of the subject vehicle and transmits a signal corresponding to the operation to the navigation apparatus 9. The HMI display apparatus 73 responds to an instruction of the navigation apparatus 9 and displays an image, outputs a sound, or the like. The displayed image includes an image guiding the operation by the occupant, an image of the route generated by the navigation apparatus 9, or the like.

2. Process Executed by Navigation Apparatus 9

Figure 4:
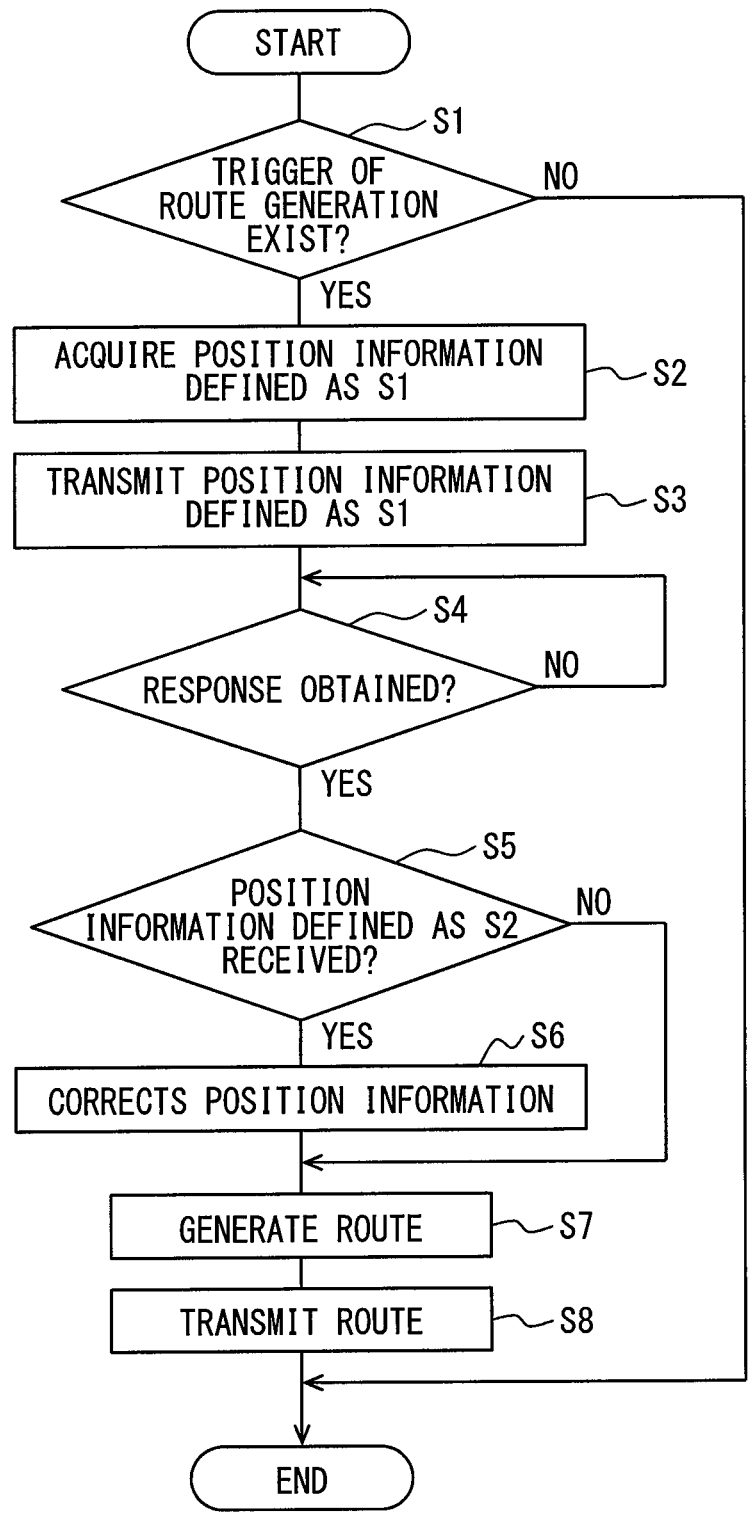
FIG. 4 is a flowchart showing a process executed by the navigation apparatus.

A process repeatedly executed by the navigation apparatus 9 each predetermined time will be explained with reference to FIG. 4. In Step 1, the position acquisition unit 27 determines whether a trigger generating the route from a present position of the subject vehicle to the destination (hereinafter, it may be merely referred to as a route) exists.

The trigger includes a case where an operation instruction to generate the route to the HMI display apparatus 73 by the occupant of the subject vehicle, a case where a deviation of the subject vehicle from the route previously generated is detected, a case where a different road condition from the moment that the route is previously generated is detected, or the like. As the different route condition, an occurrence of traffic congestion or an occurrence of a load blocked or the like are given. When the trigger exists, the process shifts to Step 2. When the trigger does not exist, the process ends.

In Step 2, the position acquisition unit 27 acquires a position information S1 of the subject vehicle at the moment by using the GPS 15, the gyro sensor 17 and the G sensor 19. The position information S1 is information that identifies the position of the subject vehicle at the moment and is generated by the navigation apparatus 9. The position information S1 may be referred to as a position information defined as S1.

In Step 3, the position information transmission unit 29 transmits the position information S1 acquired in Step 2 to the position correction apparatus 11.

In Step 4, the reception unit 31 determines whether to receive some kind of response from the position correction apparatus 11. The response is either a position information S2 described later or a normal signal described later. When the response is received, the process shifts to Step 5. When the response has not been received yet, the process returns to Step 4. The position information S2 may be referred to as a position information defined as S2.

In Step 5, the reception unit 31 determines whether the received response is the position information S2. The position information S2 identifies the position of the subject vehicle at the moment and is generated by the position correction apparatus 11. When the received response is the position information S2, the process shifts to Step 6. When the received response is not the position information S2, the process shifts to Step 7.

In Step 6, the position information S1 acquired in Step 2 is replaced by the position information S2.

In Step 7, the route generation unit 33 generates the route by using the road network information stored in the storage device 21. When the process in Step 6 is executed, the route starts at the position of the subject vehicle identified by the position information S2. When the process in Step 6 is not executed, the route starts at the subject vehicle position identified by the position information S1. The occupant of the subject vehicle inputs the destination of the route by using the HMI display apparatus 73.

In Step 8, the route transmission unit 34 transmits the route generated in Step 7 to the position correction apparatus 11.

3. Process Executed by Position Correction Apparatus 11

Figure 5:
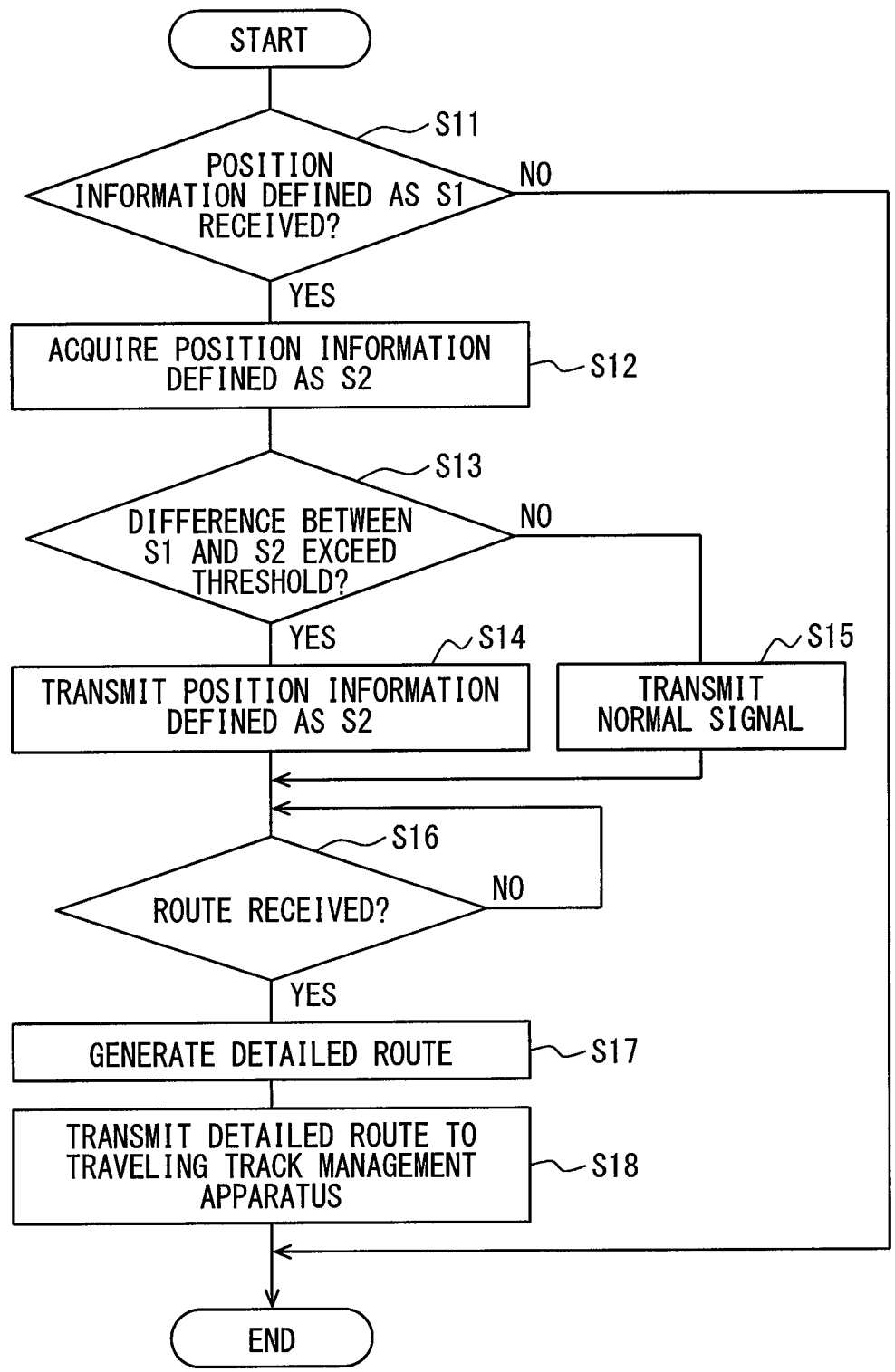
FIG. 5 is a flowchart showing a process executed by the position correction apparatus.

A process repeatedly executed by the position correction apparatus 11 each predetermined time will be explained with reference to FIG. 5. In Step 11, the reception unit 49 determines whether to receive the position information S1 from the navigation apparatus 9. The position information S1 is transmitted by the navigation apparatus 9 in Step 3. When the position information S1 is received, the process shifts to Step 12. When the position information S1 is not received, the process ends.

In Step 12, the position acquisition unit 51 and the position relation acquisition unit 57 acquires the position information S2 as bellow. The position acquisition unit 51 identifies a rough position of the subject vehicle on the traveling road at the moment by using the GPS 37, the gyro sensor 39, the G sensor 41 and the road network information stored in the storage device 43. Next, the position relation acquisition unit 57 detects the feature existing in the peripheral of the subject vehicle by using the image of the camera 67, a detection result of the millimeter wave radar 69 and the detection result of the laser radar 71, and acquires a relative position relation between the detected feature and the subject vehicle.

Next, the position acquisition unit 51 collates the rough position of the subject vehicle on the traveling road, the position information T of the feature stored in the detailed map information, and the relative position relation between the detected feature and the subject vehicle, and identifies which one of the features stored in the detailed map information and matching the detected feature as above In addition, the position acquisition unit 51 accurately identifies the position of the subject vehicle by using the identified position of the feature and the relative position relation of the subject vehicle to the feature. The position acquisition unit 51 sets the information showing the accurately detected position of the subject vehicle to the position information S2.

The position information S2 is more accurate than the position information S1. As one of reasons, it is given that the installation angles of the gyro sensor 39 and the G sensor 41 are optimized as compared with the installation angles of the gyro sensor 17 and the G sensor 19. As another reason, it is given that the position information S2 is accurately detected based on the position information T of the feature and the relative position relation between the subject vehicle and the feature.

In Step 13, the determination unit 53 determines whether the difference between the position of the subject vehicle identified by the position information S1 and the position of the subject vehicle identified by the position information S2 exceeds the predetermined threshold or determines whether the traveling road identified by the position information S1 matches the traveling road identified by the position information S2. At least when the difference exceeds the threshold or when the traveling road identified by the position information S1 mismatches the traveling road identified by the position information S2, the process shifts to Step 14. When the difference is equal to or less than the threshold and also when the traveling road identified by the position information S1 matches the traveling road identified by the position information S2, the process shifts to Step 15.

In Step 14, the position information transmission unit 55 transmits the position information S2 to the navigation apparatus 9. In Step 5, the navigation apparatus 9 determines whether to receive the position information S2 in Step 14.

In Step 15, the signal transmission unit 59 transmits the normal signal to the navigation apparatus 9.

In Step 16, the reception unit 49 determines whether to receive the route from the navigation apparatus 9. The route to be subjected to determination is the route transmitted by the navigation apparatus 9 in Step 8. When the route is received, the process shifts to Step 17. When the route is not received yet, the process returns to Step 16.

In Step 17, the detailed route generation unit 61 generates the detailed route by using the received route determined in Step 16 and the detailed map information stored in the storage device 43. The detailed route corresponds to a route that regulates the subject vehicle. The detailed route corresponds to the route.

In Step 18, the detailed route transmission unit 62 transmits the detailed route generated in Step 17 to the traveling track management apparatus 5.

4. Process Executed by Traveling Track Management Apparatus 5 and Vehicle Motion Control Apparatus 7

The traveling track management apparatus 5 receives the detailed route from the position correction apparatus 11. The traveling track management apparatus 5 generates the traveling track information as bellow by using the received detailed information. The traveling track management apparatus 5 picks up a range of the detailed route. The range is defined that a distance from the subject vehicle in the range is not greater than a predetermined maximum value. Next, the traveling track management apparatus 5 detects a peripheral moving body to be the feature or an obstacle by using an image of the camera 67, the detected result of the millimeter wave radar 69 and the detected result of the laser radar 71. The peripheral moving body actually exists on the detailed route picked up and the periphery of the detailed route, though not described in the detailed map information. Next, the traveling track management apparatus 5 corrects the detailed route picked up so that the subject vehicle avoids the feature or the peripheral moving body that the subject vehicle needs to avoid, of the detected feature and the detected moving body. The corrected detailed route is set as the traveling track. The traveling track corresponds to the route. A traveling track information identifies the traveling track. The traveling track management apparatus 5 transmits the traveling track information to the vehicle motion control apparatus 7.

The vehicle motion control apparatus 7 receives the traveling track information from the traveling track management apparatus 5. The vehicle motion control apparatus 7 controls a steering unit, a power unit and a brake unit of the subject vehicle, so that the subject vehicle automatically travels along the traveling track identified by the received traveling track information.

5. Effect Provided by Automatic Driving System 1 and a Part of Automatic Driving System 1

(1A) The position correction apparatus 11 may be possible to acquire the position information S2 that is more accurate than the position information S1 acquired by the navigation apparatus 9. At least when a difference between the position information S1 and the position information S2 exceeds the predetermined threshold or when the traveling road identified by the position information S1 is different from the traveling road identified by the position information S2, the position correction apparatus 11 transmits the position information S2 to the navigation apparatus 9. Thereby, even when the position information S1 has a large error or when the traveling route identified by the position information S1 is incorrect, the navigation apparatus 9 may be possible to accurately acquire the position of the vehicle. Consequently, the navigation apparatus 9 may be possible to generate a route starting at an accurate position of the subject vehicle.

(1B) The position correction apparatus 11 may be possible to acquire the position information S2 by using the relative relation between the feature and the subject vehicle and the position information T of the feature. Hence, it may be possible to more accurately acquire the position information S2.

(1C) When the difference between the position information S1 and the position information S2 is equal to or less than the threshold and also when the traveling road identified by the position information S1 matches the traveling road identified by the position information S2, the position correction apparatus 11 transmits the normal signal to the navigation apparatus 9. Thereby, the navigation apparatus 9 may be possible to know that the position information S1 has a small error and that the traveling identified by the position information S1 is correct.

(1D) When the navigation apparatus 9 generates the route, the navigation apparatus 9 transmits the position information S1 to the position correction apparatus 11. By contrast, the position correction apparatus 11 transmits the position information S2 or the normal signal to the navigation apparatus 9 as described above. Consequently, the navigation apparatus 9 may be possible to generate the route starting at the accurate position of the subject vehicle.

(1E) The automatic driving system 1 controls the subject vehicle so that the subject vehicle travels along the traveling track. Since the traveling track is generated with reference to the route, a starting point of the traveling track is accurate similar to the point of the traveling track. The automatic driving system 1 may be possible to automatically travel along the traveling track starting at the accurate position of the subject vehicle.

Second Embodiment

1. Difference from First Embodiment

Since a basic configuration of a second embodiment is similar to the first embodiment, the explanation with respect to the common configuration will be omitted and a difference will be mainly explained. An identical reference with the first embodiment shows the same configuration and refers to a preceding explanation.

Figure 6:
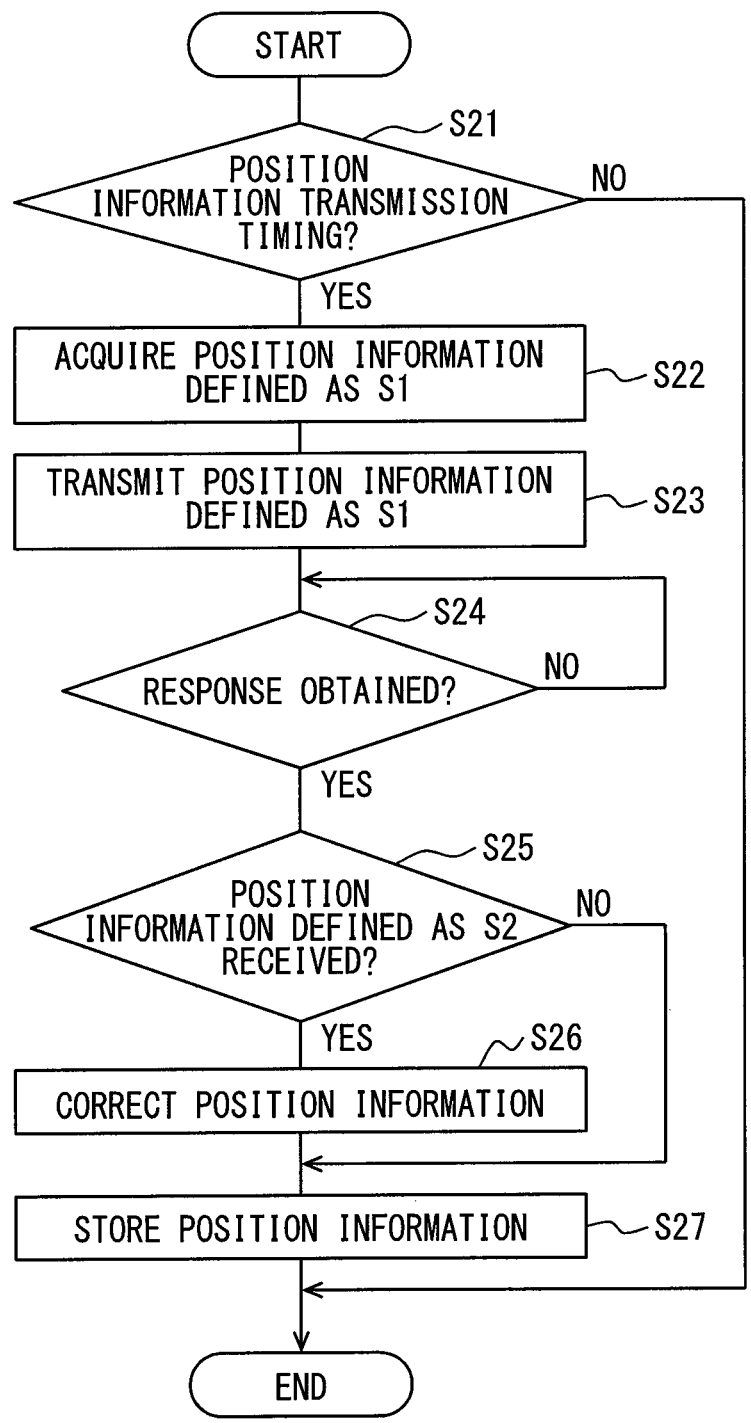
FIG. 6 is a flowchart showing a process executed by the navigation apparatus.

The navigation apparatus 9 repeatedly executes the process shown in FIG. 6 each predetermined time. In Step 21, the position acquisition unit 27 determines whether the moment is a position information transmission time. The position information transmission time is a time when the subject vehicle is traveled for a predetermined distance after the position information has been transmitted in the last time. When the moment is the position information transmission time, the process shifts to Step 22. When the moment is not the position information transmission time, the process ends.

Steps 22 to 26 are similar to Steps 2 to 6 in the first embodiment.

In Step 27, the position information of the subject vehicle is stored in the memory 25. When the process of Step 26 is executed, the stored position information becomes the position information S2 determined to be received in Step 25. When the process of Step 6 is not executed, the stored position information becomes the position information S1 acquired in Step 22. When the position information is already stored in the memory 25, the position information is overwritten by a newly stored position information.

Figure 7:
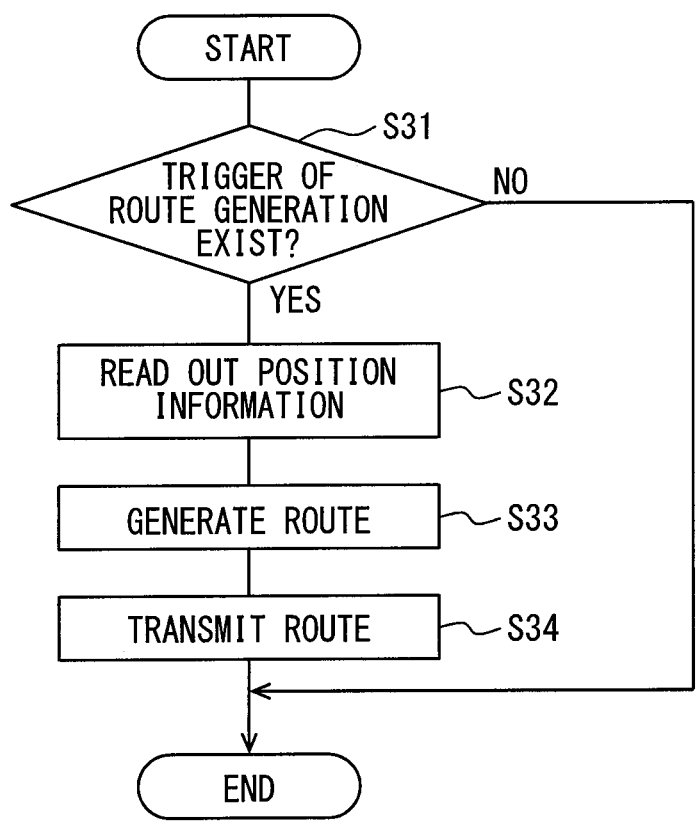
FIG. 7 is a flowchart showing a process executed by the navigation apparatus.

The navigation apparatus 9 repeatedly executes a process shown in FIG. 7 each predetermined time separately from the process shown in FIG. 6. In Step 31 of FIG. 7, similarly to Step 1 in the first embodiment, the position acquisition unit 27 determines whether the trigger generating the route exists. When the trigger exists, the process shifts to Step 32. When the trigger does not exist, the process ends.

In Step 32, the position acquisition unit 27 reads out the position information of the subject vehicle from the memory 25. The position information of the subject vehicle read out is the position information stored in the memory 25 in Step 27.

In Step 33, the route generation unit 33 generates the route by using the route network information stored in the storage device 21. The starting of the route is the position of the subject vehicle that is identified by the position information of the subject vehicle read out in Step 32.

In Step 34, the route transmission unit 34 transmits the route generated in Step 33 to the position correction apparatus 11.

2. Effect Provided by Automatic Driving System 1 and a Part of Automatic Driving System 1

According to the second embodiment described in detail as above, in addition to the effects (1A) to (1C) and (1E) of the first embodiment previously described, an effect is provided as bellow.

(2A) The navigation apparatus 9 transmits the position information S1 to the position correction apparatus 11 each time when the subject vehicle travels for a predetermined distance. By contrast, the position correction apparatus 11 transmits the position information S2 or the normal signal to the navigation apparatus 9. Consequently, the navigation apparatus 9 may be possible to acquire the accurate position information of the subject vehicle with high frequency.

Other Embodiments

In the above, embodiments of the present disclosure are explained. However, the present disclosure is not limited to the embodiments described above, and may be possible to be modified as appropriate. It may be possible to perform the present disclosure by a verified combination.

(1) The position correction apparatus 11 may transmit the route generated by the navigation apparatus 9 to the traveling track management apparatus 5. The traveling track management apparatus 5 may transmit the route generated by the navigation apparatus 9 to the vehicle motion control apparatus 7. The vehicle motion control apparatus 7 may control the subject vehicle so that the subject vehicle travels along the route generated by the navigation apparatus 9.

(2) The position information transmission time in Step 21 may be a time when a predetermined time elapses after the position information has been transmitted in the last time, for example.

(3) The position correction apparatus 11 may acquire the position information S2 through any other method. For example, the position correction apparatus 11 may acquire the position information S2 from an infrastructure having a function transmitting the position information.

(4) In Step 13, it may be only determined whether the difference between the position of the subject vehicle identified by the position information S1 and the position of the subject vehicle identified by the position information S2 exceeds the predetermined threshold. In the case, when the difference exceeds the threshold, the process shifts to Step 14. When the difference is equal to or less than the threshold, the process shifts to Step 15.

In Step 13, it may be only determined whether the traveling road identified by the position information S1 matches the traveling road identified by the position information S2. In the case, when it mismatches, the process shifts to Step 14. When it matches, the process shifts to Step 15.

(5) According to the embodiment, multiple functions that one functional element has may be implemented by multiple functional elements. One function that one functional element has may be implemented by multiple functional elements. Multiple functions that multiple functional elements have may be implemented by one functional element. One function implemented by multiple functional elements may be implemented by one functional element. A part of the configuration of the embodiment may be omitted. At least part of the configuration of the embodiment may be omitted. At least part of the configuration of the embodiment may be added and replaced to the configuration of the other embodiment. Every aspect included in technical ideas identified by only wording described in the scope of the present disclosure becomes the embodiment of the present disclosure.

(6) Except for the position correction apparatus 11 described above, various embodiments may be possible to include the program to function a computer as the controller 13, the program to function the computer as the controller 35, the non-transitory tangible storage medium such as the semiconductor memory having recorded the program, a position correction method and a route calculation method or the like.

What is claimed is:

1. A position correction apparatus mounted on a vehicle comprising:
   a processor configured to, by executing a program stored in a non-transitory storage medium,
      receive a position information defined as S1 from a navigation apparatus including a sensor, which the navigation apparatus is mounted on the vehicle and has a function acquiring the position information defined as S1 of the vehicle,
      acquire a position information defined as S2 of the vehicle with higher accuracy than the navigation apparatus,
      determine whether a difference between the position information defined as S1 and the position information defined as S2 exceeds a predetermined threshold or whether a traveling route identified by the position information defined as S1 matches a traveling route identified by the position information defined as S2, and
      transmit the position information defined as S2 to the navigation apparatus when determining that the difference exceeds the predetermined threshold or when determining that the traveling route identified by the position information defined as S1 mismatches the traveling route identified by the position information defined as S2.

2. The position correction apparatus according to claim 1, further comprising:
   a feature information storage device that stores a position information,
   wherein
   the processor is configured to
      acquire a relative position relation between a feature and the vehicle, and
   the feature information storage device stores the position information defined as T of the feature; and
   the processor is configured to acquire the position information defined as S2 by using the position relation and the position information defined as T.

3. The position correction apparatus according to claim 1, wherein:
the processor is configured to transmit, when determining that the difference is not higher than the threshold or when determining that the traveling route identified by the position information defined as S1 matches the traveling route identified by the position information defined as S2, a signal in each case to the navigation apparatus.

4. A navigation system comprising:
the position correction apparatus according to claim 1; and
the navigation apparatus according to claim 1,
wherein:
the navigation apparatus includes a processor configured to, by executing a program stored in a non-transitory storage medium, generate a route from a position identified by the position information defined as S2, which is transmitted to a destination.

5. The navigation system according to claim 4, wherein:
the navigation apparatus transmits the position information defined as S1 to the position correction apparatus when generating the route.

6. The navigation system according to claim 4, wherein:
the navigation apparatus transmits the position information defined as S1 to the position correction apparatus each time the vehicle travels for a predetermined distance.

7. An automatic driving system comprising:
the navigation system according to claim 4; and
a vehicle motion control apparatus that controls the vehicle so that the vehicle automatically travels along the route.

\* \* \* \* \*